United States Patent
Powell et al.

(10) Patent No.: US 6,558,308 B2
(45) Date of Patent: May 6, 2003

(54) AVS MELTING PROCESS

(75) Inventors: James R. Powell, Shoreham, NY (US); Morris Reich, Kew Gardens Hills, NY (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 62 days.

(21) Appl. No.: 10/063,460

(22) Filed: Apr. 25, 2002

(65) Prior Publication Data

US 2002/0165422 A1 Nov. 7, 2002

Related U.S. Application Data

(63) Continuation-in-part of application No. 09/850,623, filed on May 7, 2001, now abandoned.

(51) Int. Cl.$^7$ .................................................. A62D 3/00
(52) U.S. Cl. .......................... 588/252; 588/11; 588/19; 588/256; 65/134.8; 65/136.2; 65/374.15; 65/135.6
(58) Field of Search .............................. 588/11, 19, 252, 588/256; 65/134.8, 136.2, 374.15, 135.6

(56) References Cited

U.S. PATENT DOCUMENTS

| | | | | |
|---|---|---|---|---|
| 4,298,370 A | * | 11/1981 | Hammel | 432/5 |
| 4,446,563 A | * | 5/1984 | Willay | 373/157 |
| 4,610,711 A | * | 9/1986 | Matesa et al. | 373/27 |
| 4,654,068 A | * | 3/1987 | Kunkle et al. | 266/213 |
| 4,943,395 A | * | 7/1990 | Sasaki et al. | 264/0.5 |
| 5,367,532 A | * | 11/1994 | Boen et al. | 373/142 |
| 5,678,236 A | * | 10/1997 | Macedo et al. | 110/345 |
| 5,678,237 A | * | 10/1997 | Powell et al. | 219/660 |
| 5,843,287 A | * | 12/1998 | Wicks et al. | 204/157.15 |
| 5,947,887 A | * | 9/1999 | White et al. | 405/129.2 |
| 6,143,139 A | * | 11/2000 | Wicks et al. | 204/157.15 |
| 6,211,424 B1 | * | 4/2001 | Powell et al. | 422/129 |

OTHER PUBLICATIONS

Radioactive Isolation Consortium, LLC (RIC,LLC), "Gate 3 Requirements, Deliverables, and AVS Exploratory Developement Proposed Findings", Sep. 1999, downloaded from the internet from URL www.ricllc.com, 16 pages.*

RIC LLC's Report to Department of Energy, Contract No. DE–AC26–98FT40450, RIC AVS Exploratory Development Stage, Jan. 24, 2000, downloaded from the internet from URL www.ricllc.com, 7 pages.*

RIC LLC's Delvelopment of an Advanced Vitrification System (AVS), Jan. 22, 1999, downloaded from the internet from URL www.ricllc.com, 2 pages.*

RIC LLC's Comments on Waste Treatment Plant, Solicitation NO DE–RP27–OORV14136 with Attachment, Aug. 13, 2000, downloaded from the internet from URL www.ricllc.com, 20 pages.*

* cited by examiner

*Primary Examiner*—J. J. Swann
*Assistant Examiner*—Katherine Mitchell
(74) *Attorney, Agent, or Firm*—Louis Ventre, Jr.

(57) ABSTRACT

The Advanced Vitrification System (AVS) Melting Process is a process for vitrification of waste in a disposable canister. In the process, waste is dropped into the disposable canister from the top. While the waste is being dropped into the disposable canister, radiant energy is added to the space above the waste in the canister, such that the temperature of the gaseous atmosphere above the waste is higher than the melting point of the waste. Since only the space above the waste in the canister is heated, the temperature of the melt decreases with increasing depth of the waste in the canister. The decreasing temperature permits a small surface melt volume to be maintained and solidified product to form with increasing depth. The process continues until the disposable canister is filled, then all heating is stopped and the disposable canister allowed to cool to ambient temperature.

5 Claims, 1 Drawing Sheet

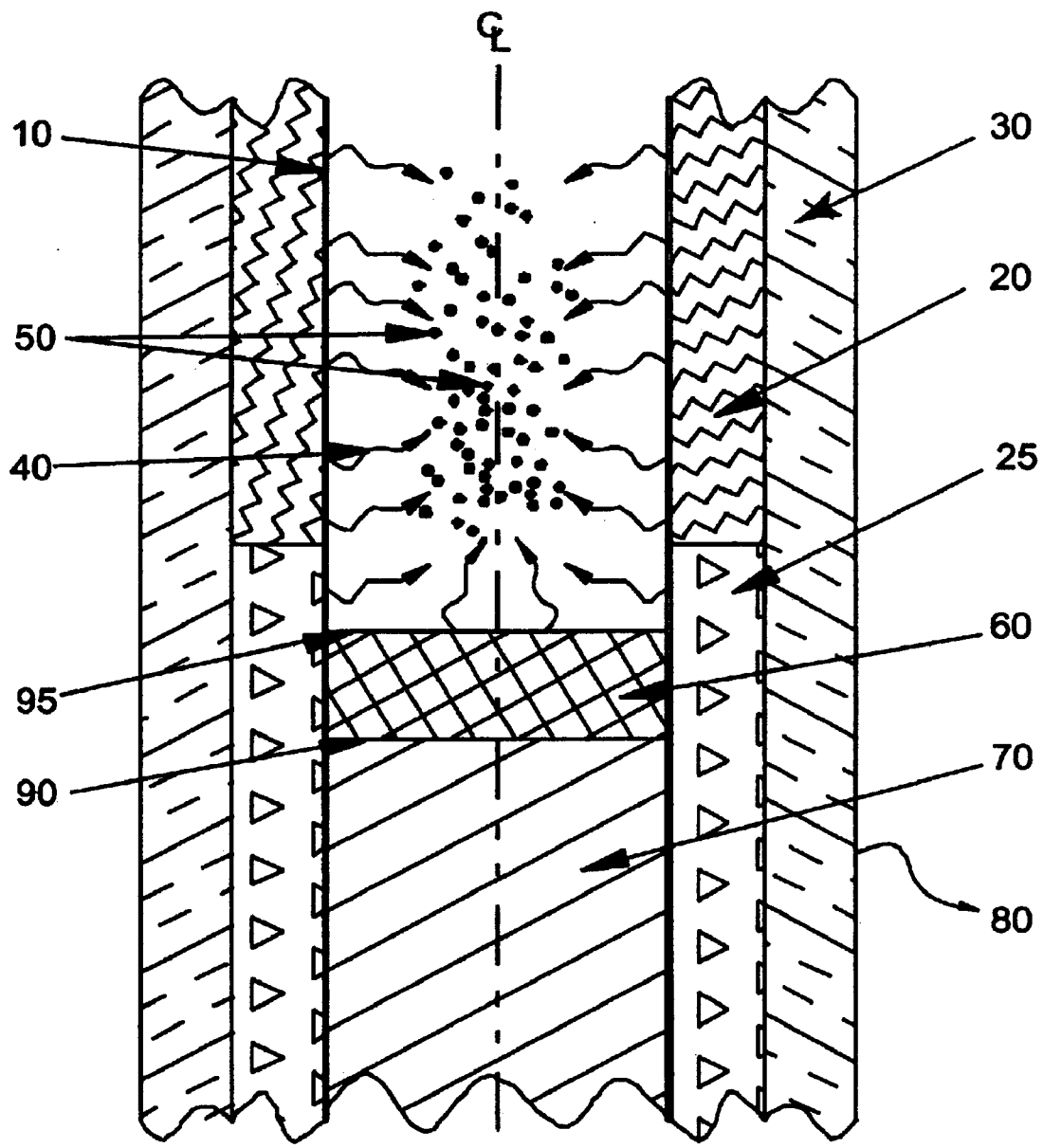

AVS MELTING PROCESS

CROSS REFERENCE TO RELATED APPLICATIONS

This is a Continuation-in-part (CIP) application of application Ser. No. 09/850,623 filed May 7, 2001, abandoned.

REFERENCED—APPLICATIONS

This CIP application claims the benefit of the filing date of U.S. patent application Ser. No. 09/850,623 filed on May 7, 2001, abandoned.

BACKGROUND OF THE INVENTION

The AVS Melting Process is a method for vitrifying waste, such as nuclear waste, in a disposable canister. The waste may be combined with additives promoting the creation of a vitrified product. Whether the waste is untreated or combined with additives, it is referred to hereinafter as "waste."

The disclosure of U.S. patent application Ser. No. 09/850,623 filed May 7, 2001 is incorporated herein by reference. The disclosure of U.S. Pat. No. 5,678,237, which describes a canister and related method of in-situ vitrification of waste materials in a disposable canister, is incorporated herein by reference.

The terms "canister" and "container" are herein used interchangeably and the term module is loosely defined to mean a canister having an inner container and an outer container of the type described in the above referenced patent. The disposable canister in the referenced patent has an inner container and an outer container and is also described herein as a module. The outer container serves as the traditional disposal container typically made of steel, which is insulated from an inner container, typically of made of graphite, by a layer of insulating material. The inner container is usually lined in alumina and serves as a crucible to melt a waste, contain the waste in its molten state, and serve as the disposal container for the vitrified product.

In the referenced patent, waste is added to the inner container then heated until it is melted. The term "melted" is defined loosely herein consistent with the meaning understood by those skilled in the art. The term "melted" includes a molten waste containing unmelted components, such as refractories, within the molten waste. These refractories melt at temperatures well above normal vitrification temperatures, which can range from between about 900 to about 1600 degrees centigrade. The unmelted refractories are typically contained in the glassy matrix forming the vitrified product.

In the referenced patent, after the waste is melted, it is allowed to cool into a solid vitrified product.

Some drawbacks in using the method of the referenced patent included low fill volume, product inhomogeneity leading to nonuniform leaching responses at various elevations of the vitrified product, product crystallization, cesium volatilization, surface foaming; and corrosion of the alumina liner. The present invention addresses these drawbacks.

Accordingly, this invention is a process for melting waste in a disposable container to a level approaching 100% of the available volume, producing a homogeneous product which promotes a uniform leaching response, minimizing product crystallization, minimizing cesium volatilization, minimizing surface foaming inside the canister, and minimizing corrosion of the alumina liner. In addition, the invention will also shorten canister fill time and reduce heating power requirements.

BRIEF SUMMARY OF THE INVENTION

The AVS Melting Process is a process for vitrification of waste in a disposable canister. In the process, waste is dropped into the disposable canister from the top. While the waste is being dropped into the disposable canister, radiant energy is added to the space above the waste in the canister, such that the temperature of the gaseous atmosphere above the waste is higher than the melting point of the waste. Since only the space above the waste in the canister is heated, the temperature of the melt decreases with increasing depth of the waste in the canister. The decreasing temperature permits a small surface melt volume to be maintained and solidified product to form with increasing depth. The process continues until the disposable canister is filled, then all heating is stopped and the disposable canister allowed to cool to ambient temperature.

BRIEF DESCRIPTION OF THE DRAWINGS

The drawing illustrates the AVS Melting Process in a vertical cut-away of a canister. The gaseous atmosphere in the empty canister is heated to a temperature above melting point temperature of the waste such that a vitrified product can be formed. Then, waste, in the form of a dried particulates which may be heated to an initial temperature below the melting point of the waste, is added to the canister so that it creates a melt pool at the bottom of the canister. Then, only the gaseous atmosphere above the melted waste is heated to a temperature above the melting point of the waste such that as more waste is added, a solidified waste can form below the melt pool. When the canister is filled to the desired height with waste, the addition of waste and the heating of the gaseous atmosphere stops, and the canister is allowed to cool.

DETAILED DESCRIPTION OF THE INVENTION

The AVS Melting Process is a process for vitrifying waste in a final disposal canister. The disposal canister may be any container capable of being heated to temperatures above the melting point of the waste without destroying the container. Typically, the canister is a cylindrical module having an inner container and an outer container. The outer container serves as the traditional disposal container typically made of stainless steel, which is insulated from an inner container, typically of made of graphite, by a layer of insulating material. The inner container is usually lined in alumina. It is usually open at one end, typically the top where waste can be added to fill the module. The inner container serves as a crucible to melt a waste, contain the waste in its molten state, and serve as the disposal container for the waste once it cools to a solidified form. The solidified waste is typically described as being a vitrified product.

The AVS Melting Process is also known as The Hot Hohlraum Melt (HHM) method. This is because, the primary method of heat transfer to the waste is a hot hohlraum, that is, the walls of the container surrounding the empty space are heated to provide radiative heating in that space. The radiant energy in the hohlraum (i.e. the space above the melt surface) both heats the waste as it drops through the hot Hohlraum, and heats the waste melt surface itself.

The HHM is in sharp contrast to heating using state of the art methods. In the state of the art, heating occurs by conduction or convection from the crucible through a solid or molten waste material within the canister. In the AVS Melting Process heating of the waste occurs through thermal radiation from the crucible wall to the space above the melt and thence into the waste passing through the hohlraum and lying at the bottom of the hohlraum.

In the AVS Melting Process, the walls of the crucible that enclose the empty space above the melt surface will essentially come to radiative thermal equilibrium with the melt layer. In the best mode of the invention, the hot hohlraum temperature would range between 1400 to 1500 degrees centigrade. At temperatures of about 1400 degrees centigrade, the thermal radiant intensity inside an inductively heated graphite/alumina crucible would be on the order of 40 Watts per square centimeter, which is a factor of about 20 greater than the heat flux out of the crucible through the thermal insulation surrounding the graphite crucible. As a consequence, there will be virtually no temperature difference along the walls of the crucible above the melt surface, even if there are substantial differences in the local inductive heating rate, or in the local thermal insulation capability.

Radiative heating is a much more efficient heat transfer process than conduction and convection, and is expected to allow faster module fill rates.

The AVS Melting Process utilizes a waste in a solid or liquid state or in a combination solid and liquid state, that is for example, a paste. If the waste is initially in a liquid state, it may be dried to a solid form and used as is, or, thereafter, pelletized to form particles. Generally, a drying and pelletizing process can be performed in one step, or in separate steps. In the best mode of the invention, the waste is added to the canister with an initial temperature below the melting point of the waste. The initial temperature of dried waste feeding into the module would generally range between about 100 to about 900 degrees centigrade. In this embodiment of the invention, the drying process and pelletizing process would be conducted at one time and would end with a particle of waste at the initial waste temperature required for introduction into the canister.

In the best mode of the invention, the initial waste temperature required for introduction into the canister would be set to promote drying and subsequent melting of waste. Typically, for a dried waste, this would be between about 400 and 500 degrees centigrade, and, for a liquid waste, would be below 100 degrees centigrade.

In the AVS Melting Process as shown in the drawing, waste (50) is slowly added to the crucible. For a solid waste, particle diameter would generally be between about 10 microns and 10,000 microns. In practice, this range of particle diameters is determined by the need for arriving at a practical fill rate, ensuring waste particle melt during and after its fall into the melt pool, striving to avoid the entrainment of small diameter waste particles in the upward flow of evolved gas, avoiding the creation of small diameter splash droplets caused by larger particles falling into the melt surface (which droplets can also be entrained in the upward flow of evolved gas), and preventing failures in any device for capturing entrained waste particles in the evolved gas stream. In one embodiment of the invention, particle diameter would range between 300 and 500 microns. In this embodiment, particle diameter range would result in completion of filling in about 1 day of a cylindrical canister with dimensions of about 4.5 meters tall and an inside diameter of about 60 centimeters.

In the AVS Melting Process, the space above the waste in a disposable canister is heated to a temperature above the melting point of the waste. For the best mode of the invention, this would be accomplished by inductively heating the graphite crucible above the melt surface. This in turn adds radiant energy to the space within the canister above the waste.

In the best mode of the invention, in order to minimize the thickness of the melt region, the heating transition from heated graphite to unheated graphite would start above the melt surface, so that the effective heating rate in the graphite/alumina susceptor would be approximately zero at the melt surface and below.

In the AVS Melting Process, the segment of the crucible below the heated segment is not actively heated and thermal leakage of about 2–3 Watts per square centimeter occurs through the insulation that surrounds the crucible. In practice, the longitudinal heating profile is not a sharp cut-off from full heating to zero heating, but a graded transition over a distance equivalent to approximately one module diameter. This maximizes the cooling rate on the vitrified product.

The drawing depicts the best mode of the invention. As shown in the drawing, an alumina liner (10) is the innermost surface. A segment of the graphite susceptor (20), which is above the molten waste product, is heated by an externally applied magnetic flux, i.e. it is inductively heated. While waste is being added, the segment of the graphite crucible being heated rises as the waste fills the crucible so that the heated segment of the graphite crucible (20) remains above the melt surface (95) and the temperature of the gaseous atmosphere above the melt surface is above the melting point of the waste. The graphite susceptor below the externally applied magnetic field (25) is not heated. A wrap of thermal insulation (30) covers the external surface of the graphite susceptor. Radiant heat (40) creates a hot hohlraum in the crucible above the melt surface (95), which is maintained at a temperature above the melting point of the Waste. The hot hohlraum also creates a small pool of molten waste (60) at the bottom of the hot hohlraum. Heat transfer (80) out of the crucible lowers the temperature of the melt pool such that a solid product (70) lies beneath the melt pool. The temperature below the bottom surface (90) of the melt pool is lower than the melting point of the waste. Regulating variables in the process can permit the regulation of the size of the melt pool (60) over the solidified product (70). These variables include the moisture content of the waste; for dried waste, the size of the waste particles; the initial temperature of the waste; the rate of adding waste; the temperature of the hot hohlraum; the height above the melt pool of the externally applied magnetic flux; and the heat transfer (80) out of the canister.

In the best mode of the invention, the AVS Melting Process involves more or less continuous feeding waste into the canister until the canister is filled to the desired height with a vitrified product. This process, therefore, holds the advantage of filled canister filled to a level approaching 100% of the available volume.

In the best mode of the invention, the AVS Melting Process maintains a narrow band melt zone. As long as the waste feed is homogenous as to chemistry, this narrow band melt zone will ensure highly uniform and homogenous vitrified product. Since the narrow band melt zone will by its very nature not permit spatial differentiation of waste feed components beyond the melt zone, the overall vitrified product will be uniform along the height of the module and thus will produce a product with a uniform leaching response.

In the best mode of the invention, the AVS Melting Process minimizes product crystallization in the vitrified product. The narrow band melt zone means that there is relatively rapid cooling and solidification of the waste. This in turn provides a minimum of time for crystallization and phase separation in forming the vitrified product.

In the best mode of the invention, the AVS Melting Process minimizes cesium volatilization. This occurs at several points in the Process. Cesium volatilization in the feed unit, whether a vibrating hopper, screw feeder, or other type of unit, will be negligible because of the low temperature involved, e.g., on the order of between 400 and 500 degrees centigrade for the best mode. Some cesium will be volatilized as the waste falls through the hot hohlraum. Since the time at high temperature is very short, less than about 1 second, and the volatilization rate is probably controlled by kinetics and not equilibrium, the fraction volatilized should be very low. Finally, convective mixing of the molten contents in a deep melt, which is the kind of the situation found in conventional large pot melter, will continuously bring fresh cesium to the surface of the melt, from which it can volatilize over a period of several hours. In contrast, however, in the AVS Melting Process, the melt band is thermally stable because the temperature monotonically decreases with depth from the surface. As a result, cesium must diffuse up from the interior of the melt in order to volatilize, instead of being convectively brought to the surface. Because the melt layer is continuously being fed with new waste material, after about 1 minute the material that was originally on the surface would be about 3 millimeter below said surface and it becomes even deeper as time goes on. Effectively then, cesium can only diffuse to the surface for only about a minute before it is buried sufficiently deep in the melt that it cannot reach the surface. The rate of cesium exposure time for the two cases, i.e., convective mixing of a deep melt to diffusion in a thin layer in the AVS Melting Process is then hours/minutes, i.e., less than about 100/1. Thus, by maintaining a short melt residence time and inhibiting convective mixing of the melt, the AVS Melting Process, therefore, will result in a much lower cesium release rate than what is currently known in the art.

In the best mode of the invention, the AVS Melting Process minimizes foaming inside the canister. Foaming occurs principally due to gases evolved from melting waste being released below the melt surface. Foaming occurs when the gases so evolve and their release to the area above the melt is retarded by the molten waste above it. If one can minimize gas evolution below the melt surface, then foaming can be minimized. In the best mode of the AVS Melting Process gas chiefly evolves from heated waste as it is dropping through the hot hohlraum and before it impacts the surface of melt. Any unmelted waste which impacts the surface of the melt will evolve gas mainly at the surface of the melt and not from deep inside a filled module. Therefore, the AVS Melting Process provides much less opportunity for foaming to occur during the vitrification process.

In the best mode of the invention, the AVS Melting Process minimizes corrosion of the alumina liner. Very little alumina corrosion is anticipated since there is no mechanism to produce a high melt velocity on the wall. In the state of the art, where there is a stationary meniscus associated with a fixed quantity of melted waste in the canister, an enhanced alumina corrosion rate is possible at high temperatures and high pH of the waste. In the state of the art, the stationary meniscus is the point at which the hot convectively driven melt changed flow direction, causing a thin boundary layer and enhanced corrosion of the alumina under certain melting temperatures and pH conditions. In the best mode of the AVS Melting Process, there is no stationary meniscus since waste is continuously added to the canister. As the waste is added, the meniscus rises and thus is continuously moving up the alumina liner. Thus, very little alumina corrosion is anticipated over the complete range of possible melting temperatures and pH conditions of the waste.

In the best mode of the invention, the AVS Melting Process will produce a filled canister in about 1 day. This compares with 3 days using state of the art processes. Because the canister needs to be heated for one-third of the time, the AVS Melting Process will also reduce heating power requirements.

While there has been described herein what is considered to be the preferred and exemplary embodiment of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A process for vitrifying waste in a disposable closed canister comprising, a. drying and pelletizing waste into particles of a diameter between 10 and 10,000 microns; b. adding energy substantially by radiation, rather than by conduction or convection, to the inside of a disposable canister in a single stage heating process such that the temperature inside the canister is above the melting point of the waste; c. adding a sufficient quantity the waste particles to the disposable canister to permit the maintenance of a melted waste layer at the bottom of the canister, wherein the initial temperature of the waste particles prior to introduction into the canister is below the melting point of the waste; d. until the canister is filled, adding more waste particles and continue adding radiant energy inside the canister above the melt surface in the canister to maintain the temperature of the melt layer at a value higher than the melting point of the waste while permitting the formation of a solid vitrified product below the melted waste layer at the bottom of the canister; and, e. removing all heating sources to allow the waste in the canister to cool to ambient temperature.

2. The process of claim 1 wherein the initial temperature of the waste prior to introduction into the canister is between about 400 and 500 degrees centigrade, the waste particle diameter is between about 300 and 500 microns, and the gaseous atmosphere is heated to between about 1400 and 1500 degrees centigrade.

3. The process of claim 1 wherein the disposable canister has an inner container made of graphite lined with alumina, an outer container insulated from the inner container made of stainless steel, and the method of adding radiant energy is by inductively heating a segment of the walls of the inner container which lies above the surface of the melted waste.

4. A process for vitrifying waste in a disposable closed canister comprising, a. adding energy substantially by radiation, rather than by conduction or convection, to the inside of a disposable canister in a single stage heating process such that the temperature inside the canister is above the melting point of the waste; b. adding a sufficient quantity of waste to the disposable canister to permit the maintenance of a remelted waste layer at the bottom of the canister, wherein the initial temperature of the waste prior to introduction into the canister is below the melting point of the waste; c. until the canister is filled, adding more waste and continue adding radiant energy inside the canister above the melt surface in the canister to maintain the temperature of the melter layer at a value higher than the melting point of the waste while permitting the formation of a solid vitrified product below the melted waste layer at the bottom of the canister; and, d. removing all heating sources to allow the waste in the canister to cool to ambient temperature.

5. The process of claim 4 wherein the disposable canister has an inner container made of graphite lined with alumina, an outer container insulated from the inner container made of stainless steel, and the method of adding radiant energy is by inductively heating the segment of the walls of the inner container which lies above the surface of the melted waste.

* * * * *